(12) United States Patent
Walter

(10) Patent No.: US 9,987,771 B2
(45) Date of Patent: Jun. 5, 2018

(54) METHOD OF MANUFACTURE OF AN ELASTOMERIC SEAL

(71) Applicant: Bronislav Walter, Edmonton (CA)

(72) Inventor: Bronislav Walter, Edmonton (CA)

( * ) Notice: Subject to any disclaimer, the term of this patent is extended or adjusted under 35 U.S.C. 154(b) by 279 days.

(21) Appl. No.: 14/709,174

(22) Filed: May 11, 2015

(65) Prior Publication Data

US 2015/0321390 A1 Nov. 12, 2015

Related U.S. Application Data

(60) Provisional application No. 61/990,833, filed on May 9, 2014.

(51) Int. Cl.
| | |
|---|---|
| *B29C 39/02* | (2006.01) |
| *B29C 39/12* | (2006.01) |
| *B29C 39/26* | (2006.01) |
| *B29L 31/26* | (2006.01) |
| *B29K 75/00* | (2006.01) |

(52) U.S. Cl.
CPC ............ *B29C 39/12* (2013.01); *B29C 39/021* (2013.01); *B29C 39/023* (2013.01); *B29C 39/025* (2013.01); *B29C 39/028* (2013.01); *B29C 39/123* (2013.01); *B29C 39/26* (2013.01); *B29K 2075/00* (2013.01); *B29L 2031/26* (2013.01)

(58) Field of Classification Search
None
See application file for complete search history.

(56) References Cited

U.S. PATENT DOCUMENTS

| | | | |
|---|---|---|---|
| 3,320,339 A * | 5/1967 | Smith | ................. B29C 44/0469 264/317 |
| 6,099,289 A | 8/2000 | Jens et al. | |
| 7,731,884 B2 | 6/2010 | Knapp et al. | |
| 8,676,344 B2 | 3/2014 | Desai et al. | |

* cited by examiner

*Primary Examiner* — Edmund Lee
(74) *Attorney, Agent, or Firm* — Seed IP Law Group LLP

(57) ABSTRACT

There is provided a method of manufacturing a sealing element, the method having the steps of providing a mold comprising a molding cavity in the shape of the sealing element, the mold having inner walls and outer walls, placing a ring-shaped separator concentrically in the mold, pouring a first elastomer having a first hardness into a center of the separator, and pouring a second elastomer having a second hardness that is different from the first hardness between the separator and the inner walls of the mold.

11 Claims, 4 Drawing Sheets

METHOD OF MANUFACTURE OF AN ELASTOMERIC SEAL

BACKGROUND

Technical Field

This relates to a method of manufacturing an elastomeric seal to be used to seal pipelines.

Description of the Related Art

Pipelines are often used to carry hazardous or potentially explosive materials. In order to perform tasks such as welding or maintenance, it is necessary to seal the pipeline to control explosive gases. Residual vapors are traditionally controlled using bentonite or "mud-plugs" to seal the open end of pipes. Sloughing, drying and improper installation of the mud-plug can and has led to the release of explosive or noxious gases into the maintenance area.

BRIEF SUMMARY

According to an aspect, there is provided a method of manufacturing a sealing element, the method having the steps of providing a mold comprising a molding cavity in the shape of the sealing element, the mold having inner walls and outer walls; placing a ring-shaped separator concentrically in the mold; pouring a first elastomer having a first hardness into a center of the separator; and pouring a second elastomer having a second hardness that is different from the first hardness between the separator and the inner walls of the mold.

According to another aspect, the method may further comprise removing the ring-shaped separator and allowing the first elastomer and the second elastomer to merge together at an interface between the first elastomer and the second elastomer.

According to another aspect, a preliminary layer of elastomer may be poured into the mold before the separator is placed in the mold.

According to another aspect, the preliminary layer of elastomer may be the first elastomer.

According to another aspect, the method may further comprise the step of permitting the elastomer to set.

According to another aspect, the method may further comprise the step of removing the sealing element from the mold.

According to another aspect, the method may further comprise adding additional first elastomer after removing the separator.

According to another aspect, spacers may be placed in the mold to define air passages prior to pouring the first elastomer and may be removed after pouring the second elastomer.

According to another aspect, the mold may further comprise a clamp that is tightened after the spacers are removed.

According to another aspect at least one of the first elastomer and the second elastomer may be urethane.

According to an aspect, there is provided a mold for manufacturing a sealing element, the mold comprising a circular base having a radius measured from a center of the base to an outer edge; a molding cavity comprising plates stacked on the base, the stacked plates each comprising rings having an inner radius measured from the center of each ring to an inner edge, the inner radius of each ring being less than the radius of the base, one of the rings comprising a bottom ring that is stacked on top of the base, one or more other rings being stacked successively on top of the bottom ring, and the one or more other rings having successively larger inner radii as they are stacked up from the base; and a clamp that clamps the stacked plates to the base.

According to another aspect, the mold may further comprise a separator ring having an inner radius less than the inner radius of the bottom ring.

According to an aspect, there is provided a method of manufacturing a sealing element, the method having the steps of providing a mold, the mold comprising a circular base having a radius measured from a center of the base to an outer edge; a molding cavity comprising plates stacked on the base, the stacked plates each comprising rings having an inner radius measured from the center of each ring to an inner edge, the inner radius of each ring being less than the radius of the base, one of the rings comprising a bottom ring that is stacked on top of the base, one or more other rings being stacked successively on top of the bottom ring, and the one or more other rings having successively larger inner radii as they are stacked up from the base; and a clamp that clamps the stacked plates to the base; placing spacers between the stacked plates to define air passages; pouring a first portion of a first elastomer into the mold, the first elastomer having a first hardness; placing a separator ring concentrically into the mold, the separator ring having an inner radius less than the inner radius of the bottom ring; pouring a second portion of the first elastomer into the center of the separator ring; pouring a first portion of a second elastomer, the second elastomer having a second hardness that is less than the first hardness, into the outside of the separator ring between the separator ring and the inner edges of the stacked plates; removing the separator ring and allowing the second portion of the first elastomer and the first portion of the second elastomer to merge together at an interface between the first elastomer and the second elastomer; removing the spacers from between the stacked plates; tightening the clamp; allowing the elastomer to set; and removing the sealing element from the mold.

According to another aspect, the method may further comprise adding additional first elastomer after removing the separator ring.

According to another aspect at least one of the first elastomer and the second elastomer may be urethane.

BRIEF DESCRIPTION OF THE DRAWINGS

These and other features will become more apparent from the following description in which reference is made to the appended drawings, the drawings are for the purpose of illustration only and are not intended to be in any way limiting, wherein.

DETAILED DESCRIPTION

Figure 1:
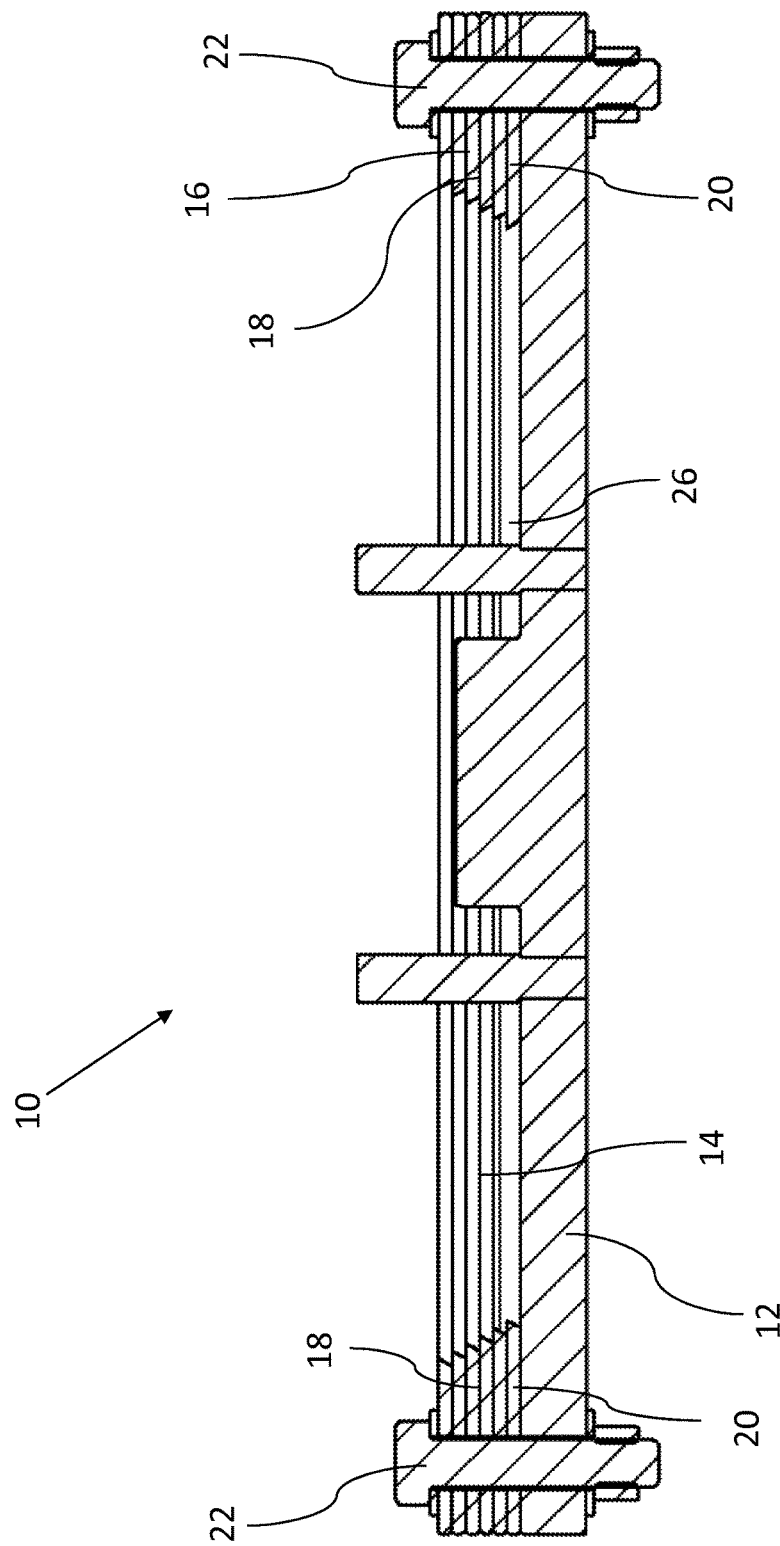
FIG. 1 is a front elevation view of a mold for manufacturing a urethane seal with a first layer of urethane.

A mold for manufacturing an elastomeric seal, generally identified by reference numeral 10, will now be described with reference to FIGS. 1 through 4.

The example described below has been described in terms of urethane materials, as this is a common type of material used for pipeline seals. However, it will be understood that other elastomers may also be used that are suitable for use as a sealing element and that may be formed through a molding process as described below.

Figure 2:
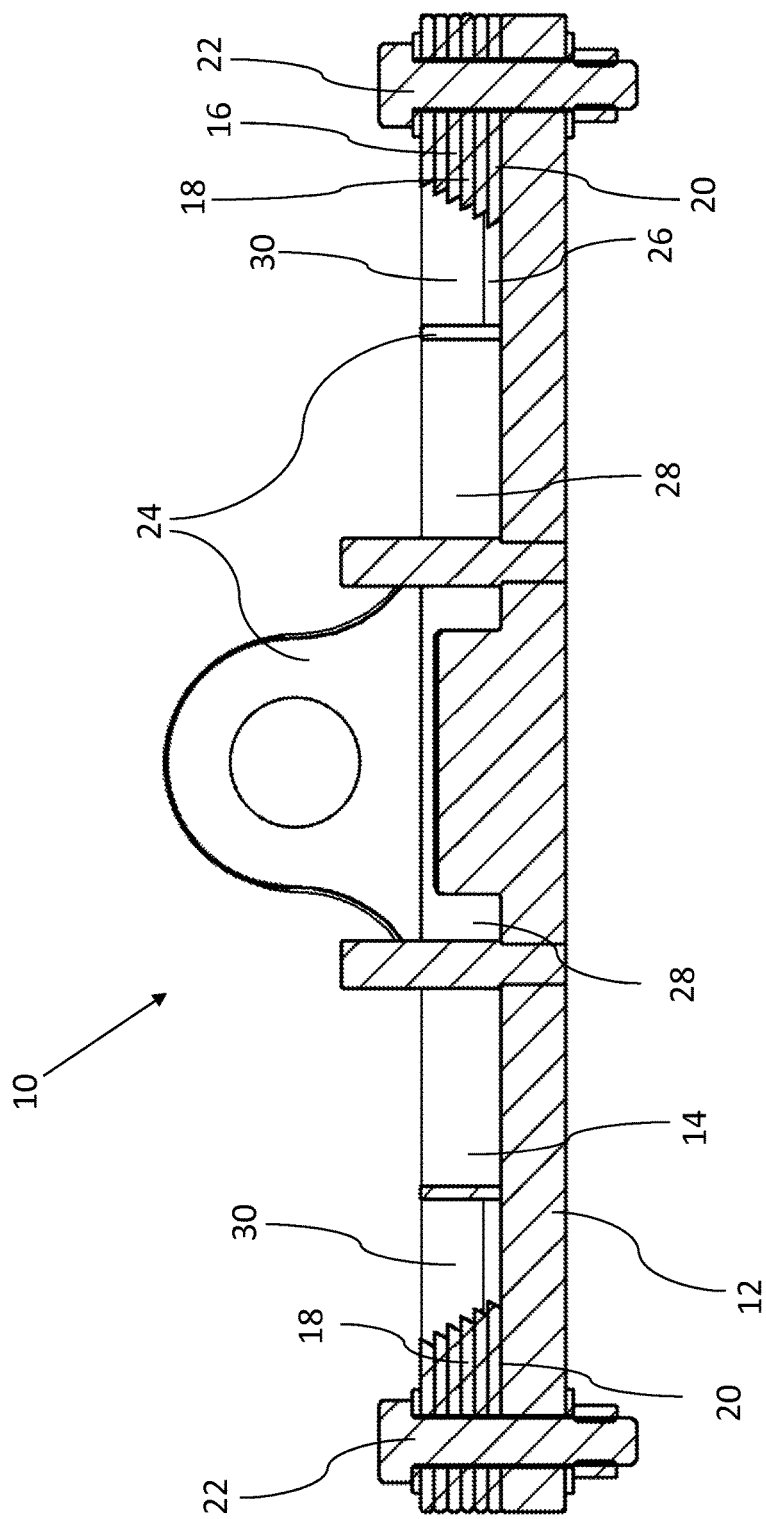
FIG. 2 is a front elevation view of a mold for manufacturing a urethane seal with a separator in the mold and second layers of urethane.
Figure 4:
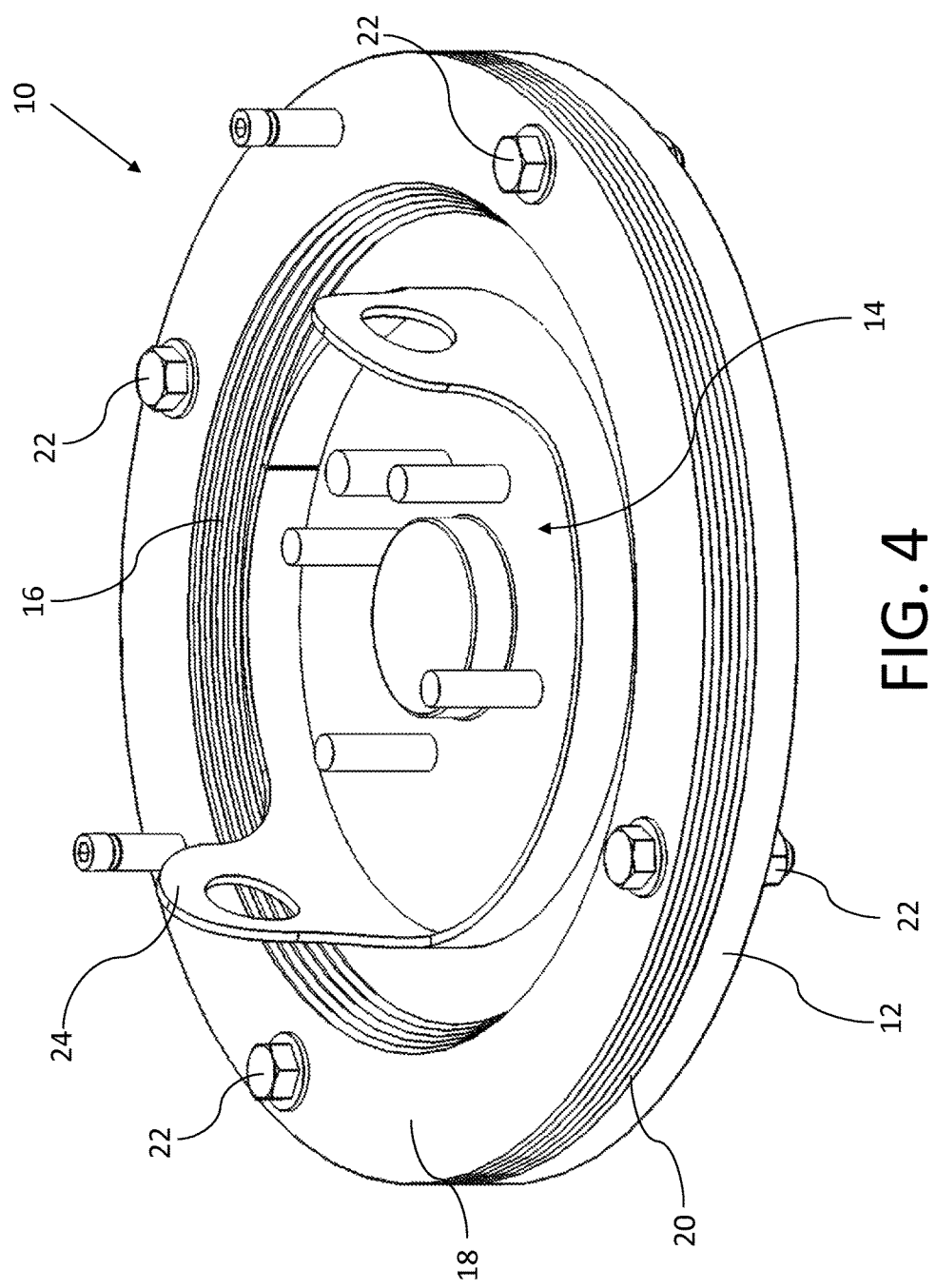
FIG. 4 is a perspective view of a mold for manufacturing a urethane seal.

Referring to FIG. 1, mold 10 has a circular base 12. The radius of circular base 12 is measured from the center of the circular base 12 to an outer edge, and will be selected based on the size of urethane seal that is to be manufactured. As will be understood by those skilled in the art, the size of the urethane seal will be determined based on the object to be sealed. The following examples will be described in terms of a pipeline to be sealed, but it will be appreciated that the seal could be used in other applications, such as for seals in plumbing operations. The mold 10 has a molding cavity 14 formed by the base 12 and the walls 16 of the mold 10. Referring to FIG. 4, walls 16 are preferably formed by plates 18 stacked on the base 12. The stacked plates 18 are rings having an inner radius that is less than the radius of the base 12. One of the rings will be a bottom ring 20 that is stacked on top of the base 12, and the other rings 18 will be stacked successively on top of this bottom ring 20. Referring again to FIG. 1, the rings 18, starting with bottom ring 20, will have successively larger inner radii as they are stacked up from the base 12. The mold 10 also has a clamp 22 that clamps the stacked plates 18 to the base 12. As shown, the clamp 22 may be a bolt passing through the stacked plates 18 and the base 12. However, any clamping method known in the art may be used to clamp the stacked plates 18. Referring to FIG. 2, mold 10 may have a removable separator ring 24 that fits within the inner radius of the bottom ring 20.

Referring to FIG. 1, the seal is manufactured by pouring urethane into the molding cavity 14 of the mold 10, as the molding cavity 14 has the shape of the sealing element to be manufactured. In a preferred embodiment, a preliminary layer of urethane 26 is poured into the bottom of the molding cavity 14 as a first step. It is possible to make the seal with this step omitted. However, this step allows a seal to be made with a layer of urethane 26 that may have different properties than the rest of the seal, such as a harder urethane designed to provide additional structural integrity to the seal. Referring to FIG. 2, separator ring 24 is next placed concentrically into the molding cavity. As shown, if the preliminary layer of urethane 26 is present, separator ring 24 is inserted prior to the preliminary layer setting or hardening, and will preferably pass through the preliminary layer. However, it is also possible that separator ring 24 would pass through only part of the preliminary layer 26, or rest on top of the preliminary layer 26. As will be understood from the following steps, the position of separator ring 24 will have some impact on the way the materials interact as they are poured into molding cavity 14.

After separator ring 24 has been positioned as desired, a first urethane 28 is poured into the center of the separator ring 24, forming the middle of the sealing element, and a second urethane 30 is poured between the separator ring 24 and the inner walls of the mold, forming the outside of the sealing element. In a preferred embodiment, first and second urethanes 28 and 30 will have different properties, such as a different hardness, with the first urethane 28 preferably harder than the second urethane 30. Preliminary layer 26 may be formed from urethane of the same hardness as first urethane 28. In one example, the first urethane 28 may be 83a durometer, and the second urethane 30 may be 75a durometer. In use, this results in the outside of the seal deforming to a greater degree than the middle, providing a combination of structural integrity and sealing capability. As an example, the sealing element may have a 1" outside diameter cast in a softer urethane than the inner circular core. It will also be understood that urethanes may be selected based on different properties other than hardness.

Figure 3:
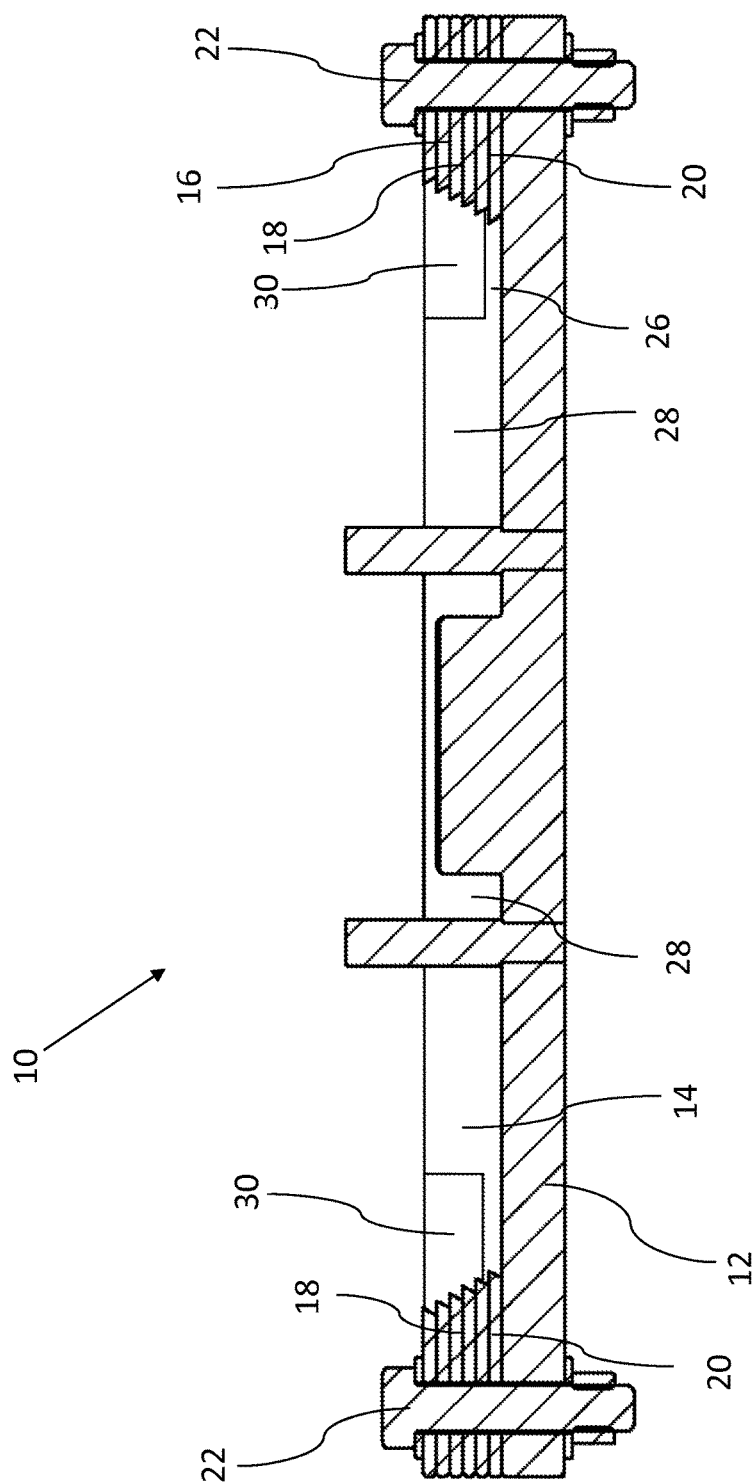
FIG. 3 is a front elevation view of a mold for manufacturing a urethane seal with the separator removed.

Referring to FIG. 3, after the first urethane 28 and the second urethane 30 are poured, the separator ring 24 is then lifted out of the molding cavity 14 and the two urethanes are allowed to merge together at the interface between the first urethane 28 and the second urethane 30. The degree to which the two urethanes merge together at the interface may be influenced by the composition of the urethanes, how quickly the pouring of the urethane is complete, and how close to setting the two urethanes are when the separator ring 24 is removed. When the two urethanes merge together they may form a homogenous urethane at the interface. In some cases, when the separator ring 24 is removed, it is necessary to top up the urethane levels in the molding cavity 14, depending on the relative displacement of the separator ring 24 and the volume of the molding cavity 14. In a preferred embodiment when necessary to top up the molding cavity 14, the first urethane 28 and the second urethane 30 are poured simultaneously.

Referring to FIG. 4, as the mold 10 is made of stacked plates 18 instead of a single unit, air passages can be provided that allow bubbles to escape from the mold 10. When the mold 10 is assembled and before any urethane is poured, spacers such as thin shims may be placed in the mold 10 to define these air passages. Once all the urethane has been poured, the spacers are removed and the mold is tightened by a clamp 22, such as bolts or other clamping mechanisms as will be understood by one skilled in the art. Once the urethanes have been poured, the separator ring 24 has been removed, and the mold has been tightened by clamp 22 (if necessary), the urethanes can be permitted to set to form a sealing element. The sealing element can then be removed from the mold. Referring to FIG. 1, the shape of the molding cavity 14 is preferably such that the seal will be formed with multiple ridges along its outer edge. When in use, these multiple ridges allow the sealing element to create multiple seals against the pipeline for additional protection against the escape of vapors.

In one example, the sealing element formed in mold 10 may be used as a temporary vapor barrier within a pipeline and removed after use. Alternatively, it may be attached to a pipeline pig and be left in the pipeline to be transported to a downstream scraper trap for removal. The sealing element formed by this method can be used for various purposes and may be inserted into the pipeline in a variety of ways, as known in the art. Preferably, the operator compresses the sealing element, inserts it into the pipeline, and then releases the compressor to allow the seal to contact the pipe. The multiple ridges will then contact the pipe wall to provide multiple seals. When required, a vent line may be attached to the pipeline on the far side of the sealing element, and the vent line can then be extended a safe distance away to release any gas build up.

In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

The scope of the following claims should not be limited by the preferred embodiments set forth in the examples above and in the drawings, but should be given the broadest interpretation consistent with the description as a whole.

What is claimed is:

1. A method of manufacturing a sealing element, the method having the steps of:
   providing a mold comprising a molding cavity in the shape of the sealing element, the molding cavity comprising:
   a base;
   plates stacked on the base, each plate comprising a ring having an inner radius measured from the center of each ring to an inner edge, the inner radius of each ring being less than the radius of the base, wherein one of the rings comprises a bottom ring that is stacked on top of the base, and one or more other rings are stacked successively on top of the bottom ring, the one or more other rings having successively larger inner radii as they are stacked up from the base;
   defining air passages between the stacked plates;
   placing a ring-shaped separator concentrically in the molding cavity;
   pouring a first elastomer having a first hardness into a center of the separator; and
   pouring a second elastomer having a second hardness that is different from the first hardness between the separator and the inner walls of the mold;
   permitting the elastomer to set; and
   removing the sealing element from the mold.

2. The method of claim 1, wherein the method further comprises removing the ring-shaped separator and allowing the first elastomer and the second elastomer to merge together at an interface between the first elastomer and the second elastomer.

3. The method of claim 1, wherein a preliminary layer of elastomer is poured into the mold before the separator is placed in the mold.

4. The method of claim 3, wherein the preliminary layer of elastomer is the first elastomer.

5. The method of claim 2, wherein the method further comprises adding additional first elastomer after removing the separator.

6. The method of claim 1, wherein the air passages are defined by spacers placed between the stacked plates to define air passages prior to pouring the first elastomer, and wherein the spacers are removed after pouring the second elastomer.

7. The method of claim 6, wherein the molding cavity further comprises a clamp that is tightened after the spacers are removed.

8. The method of claim 1, wherein at least one of the first elastomer and the second elastomer are urethane.

9. A method of manufacturing a sealing element, the method having the steps of:
   providing a mold, the mold comprising:
   a circular base having a radius measured from a center of the base to an outer edge;
   a molding cavity comprising plates stacked on the base, the stacked plates each comprising rings having an inner radius measured from the center of each ring to an inner edge, the inner radius of each ring being less than the radius of the base, one of the rings comprising a bottom ring that is stacked on top of the base, one or more other rings being stacked successively on top of the bottom ring, and the one or more other rings having successively larger inner radii as they are stacked up from the base; and
   a clamp that clamps the stacked plates to the base;
   placing spacers between the stacked plates to define air passages;
   pouring a first portion of a first elastomer into the mold, the first elastomer having a first hardness;
   placing a separator ring concentrically into the mold, the separator ring having an inner radius less than the inner radius of the bottom ring;
   pouring a second portion of the first elastomer into the center of the separator ring;
   pouring a first portion of a second elastomer, the second elastomer having a second hardness that is less than the first hardness, into the outside of the separator ring between the separator ring and the inner edges of the stacked plates;
   removing the separator ring and allowing the second portion of the first elastomer and the first portion of the second elastomer to merge together at an interface between the first elastomer and the second elastomer;
   removing the spacers from between the stacked plates;
   tightening the clamp;
   allowing the elastomer to set; and
   removing the sealing element from the mold.

10. The method of claim 9, wherein the method further comprises adding additional first elastomer after removing the separator ring.

11. The method of claim 9, wherein at least one of the first elastomer and the second elastomer are urethane.

* * * * *